United States Patent
Anstey

(10) Patent No.: US 10,322,707 B2
(45) Date of Patent: Jun. 18, 2019

(54) SELF TESTING PROCESS FOR A RAILWAY BRAKE SYSTEM

(71) Applicant: Knorr-Bremse Rail Systems (UK) Limited, Melksham, Wiltshire (GB)

(72) Inventor: Nigel Anstey, Melksham (GB)

(73) Assignee: Knorr-Bremse Rail Systems (UK) Limited, Melksham, Wiltshire (GB)

( * ) Notice: Subject to any disclaimer, the term of this patent is extended or adjusted under 35 U.S.C. 154(b) by 121 days.

(21) Appl. No.: 15/512,796

(22) PCT Filed: Aug. 13, 2015

(86) PCT No.: PCT/GB2015/000239
§ 371 (c)(1),
(2) Date: Mar. 20, 2017

(87) PCT Pub. No.: WO2016/027046
PCT Pub. Date: Feb. 25, 2016

(65) Prior Publication Data
US 2017/0247024 A1    Aug. 31, 2017

(30) Foreign Application Priority Data
Aug. 22, 2014   (GB) .................................. 1414966.0

(51) Int. Cl.
*B60T 7/12* (2006.01)
*B60T 17/22* (2006.01)
*B60T 13/66* (2006.01)

(52) U.S. Cl.
CPC .............. *B60T 17/228* (2013.01); *B60T 7/12* (2013.01); *B60T 13/665* (2013.01); *B60T 17/221* (2013.01); *B60T 2270/406* (2013.01)

(58) Field of Classification Search
CPC . B60T 17/22; B60T 7/12; B60T 13/66; B60T 17/228; B60T 13/665; B60T 7/042;
(Continued)

(56) References Cited

U.S. PATENT DOCUMENTS 6,332,354 B1 * 12/2001 Lalor ........................ B60T 8/00
701/70
6,406,102 B1 * 6/2002 Arnold .................... B60T 7/042
303/20

(Continued)

OTHER PUBLICATIONS

Ke et al., A condition monitoring system of the disk brake based on nRF24L01, 2011, IEEE, p. 283-286 (Year: 2011).*
(Continued)

*Primary Examiner* — McDieunel Marc
(74) *Attorney, Agent, or Firm* — Stites & Harbison, PLLC; David W. Nagle, Jr.

(57) ABSTRACT

A brake system has prime functions involving active control of equipment by a brake ECU, which brake ECU comprises a microcontroller and a non-volatile memory. The non-volatile memory is adapted to store the result of tests on the safety circuits carried out during, before or after operation of the brake system, the result of the tests being assigned one of at least two statuses, at least one of the said statuses being indicative of an unhealthy test. At start-up of the brake system self-tests are carried out on the circuits or components of the brake system for which an unhealthy status has been stored in the non-volatile memory, thereby enabling the brake system to operate prime functions without prior self-test.

6 Claims, 2 Drawing Sheets

(58) Field of Classification Search
CPC .... B60T 8/00; G06F 11/2236; G06F 11/1004; G06F 11/1446; G06F 11/3688; G06F 17/5009; B60R 21/013; B60W 50/085; B60K 6/46
See application file for complete search history.

(56) References Cited

U.S. PATENT DOCUMENTS

| | | | | |
|---|---|---|---|---|
| 6,421,790 | B1* | 7/2002 | Fruehling | G06F 11/1004 714/30 |
| 6,625,688 | B1* | 9/2003 | Fruehling | G06F 11/2236 711/109 |
| 7,895,025 | B2* | 2/2011 | Boutin | G06F 17/5009 700/29 |
| 8,117,490 | B2* | 2/2012 | Haller | G06F 11/1446 711/173 |
| 8,483,949 | B2* | 7/2013 | Taguchi | B60W 50/085 340/438 |
| 9,575,877 | B2* | 2/2017 | Ishigooka | G06F 11/3688 |
| 2008/0219866 | A1* | 9/2008 | Kwong | B60K 6/46 417/410.1 |
| 2010/0305818 | A1* | 12/2010 | Doerr | B60R 21/013 701/46 |
| 2014/0046514 | A1* | 2/2014 | Jennek | B60T 7/042 701/20 |
| 2014/0278439 | A1* | 9/2014 | Rajagopal | G10L 15/01 704/275 |

OTHER PUBLICATIONS

Bernardi et al., Software-Based On-Line Test of Communication Peripherals in Processor-Based Systems for Automotive Applications, 2006, IEEE, p. 1-6 (Year: 2006).*

Liu et al., A novel design of train air brake test instrument, 2010, IEEE, p. 1-4 (Year: 2010).*

Novak et al., Automated Testing of Electronic Control Units Compatibility in Vehicle Can Networks, 2005, IEEE, p. 1423-1427 (Year: 2005).*

* cited by examiner

SELF TESTING PROCESS FOR A RAILWAY BRAKE SYSTEM

The invention relates to a self-test process for a railway brake system, in particular, but not exclusively for a brake system for a freight train.

On powering up a train, it is required for safety reasons to carry out a preparatory test to ensure that the train is safe to use. Multiple systems are checked, including the brake system.

Within a brake system, the functions are divided into prime and secondary functions. Prime functions are considered as functions of the brake system, which involve active control of the equipment on which it is fitted. Implicit in the prime functionality will be any diagnostic activities required to ensure the safe operation of each function. Secondary functions are functions provided by the brake system which do not influence the operation of the equipment to which the brake system is attached. Secondary functions may typically provide additional information or diagnostic activities which are not critical to the safe operation of prime functions.

One of the prime functions of the brake system is Wheel-slide Protection. Wheel-slide Protection (WSP) involves the control of the brake cylinder pressure to limit the level of wheel-slide during brake under low adhesion conditions. This prevents wheel damage caused by sliding or locked axles and utilises the available adhesion to efficiently stop or slow the wagon.

For each prime function, a safe state is defined in which its control outputs are set to a state defined to provide a safe mode of operation of that function within the brake system. Each prime function operates in its safe state during start-up and at power-down.

During operation the brake controller, which may be an Electronic Control Unit (ECU), must assure safe operation of the brake system by monitoring the operation of the safety circuits with a combination of self-tests, running tests and on-demand tests.

Self-tests are diagnostic test sequences run by the brake controller which actively drive or change the state of the system in order to generate specific conditions and test for the correct operation of the safety circuits. In particular self-tests generate states which would not occur during normal operation of the brake system in order to test for faults in the safety circuits that could otherwise remain undetected (dormant faults). Running tests are diagnostic tests which passively monitor the brake system to detect faults during operation. On-demand tests are a set of running tests, in particular tests of safety circuits, which can only be carried out when a specific mode of operation is demanded of the brake controller, this will include operation in fault conditions.

As the frequency of the events which may allow on-demand testing of a safety circuit for a prime function is indeterminate, self-tests are required to detect dormant faults in these circuits. By their nature, self-tests of prime functions cannot be performed during normal operation. Currently known systems run all self-tests of prime functions immediately on start-up of the train during which time normal train operation is inhibited. For trains in which the self-testing of many system components must be sequenced this can take as long as 30 minutes (train readiness).

The present invention therefore seeks to provide a method of self-testing which reduces the time between the start-up of the train and functional operation.

According to the invention there is provided a brake system having prime functions, which prime functions involve active control of equipment by a brake ECU, which brake ECU comprises a microcontroller and a non-volatile memory, the non-volatile memory being adapted to store the result of running, on-demand or self-tests on the safety circuits carried out during, before or after operation of the brake system, the result of the tests being assigned one of at least two statuses, wherein at least one of the said statuses is indicative of an unhealthy test, wherein at start-up of the brake system self-tests are carried out on the circuits or components of the brake system for which an unhealthy status has been stored in the non-volatile memory, thereby enables the brake system to operate prime functions without prior self-test.

Preferably, for each test relating to operation of a prime function, a nominal test period is defined, which nominal test period is less than or equal to a proof test period for the said safety circuit, wherein if the nominal test period for a test is exceeded the brake system operates the said safety circuit in a fail-safe mode.

Preferably, tests are assigned a priority status and tests are conducted at close down in order of the priority. Preferably, failed tests are assigned the highest priority. Preferably, if the nominal test period has been exceeded, the brake system assigns a status of overdue to the circuit. Preferably, overdue status circuits are assigned the next highest priority.

The solution according to the invention advantageously stores and uses test data from the last use of the brake system to determine current health status of the brake system. The prime functions protected by such self-tests are inhibited until sufficient tests are passed. This enables the time required to conduct start-up testing to be significantly reduced thereby reducing overall train readiness time. Moreover, this enables the brake system to operate prime functions without prior self-test in instances where there is no power available during the train readiness period as is usually the case on freight trains.

An exemplary embodiment of the invention will now be described in greater detail with reference to the drawings in which.

A railway brake system for a freight train comprises a main brake pipe which is in fluid communication with a brake distributor, which brake distributor is fluidly connected via a conduit to relay valves, each of which relay valves are connected to a respective dump valve, which dump valves are connected to a respective brake cylinder. The brake distributor will typically have integral relay valve capability. There will generally be one relay and one dump valve per bogie, or one dump valve per axle. It is also known to use variable load valves in place of the relay valves.

An auxiliary reservoir is provided which stands in fluid communication via a first outlet port with the brake distributor and also in fluid communication via a second outlet port with each of the relay valves. The auxiliary reservoir pressure is protected by a check valve in the distributor. In use, the auxiliary reservoir stores the energy, in the form of compressed air, used to apply the brakes. The auxiliary reservoir is charged using the air supply in the brake pipe.

Each dump valve comprises a Hold and a Vent valve. The Hold valve is such that it prevents fluid entering the respective brake cylinder and the Vent valve such that it removes fluid in the brake cylinder. The safe state for this system is such that both the Hold and Vent valves are disabled, thereby allowing the normal operation of the brake cylinder controlled by the brake distributor. The valves are operable under the control of a brake ECU so as to provide wheel slide protection functionality (WSP).

Figure 1:
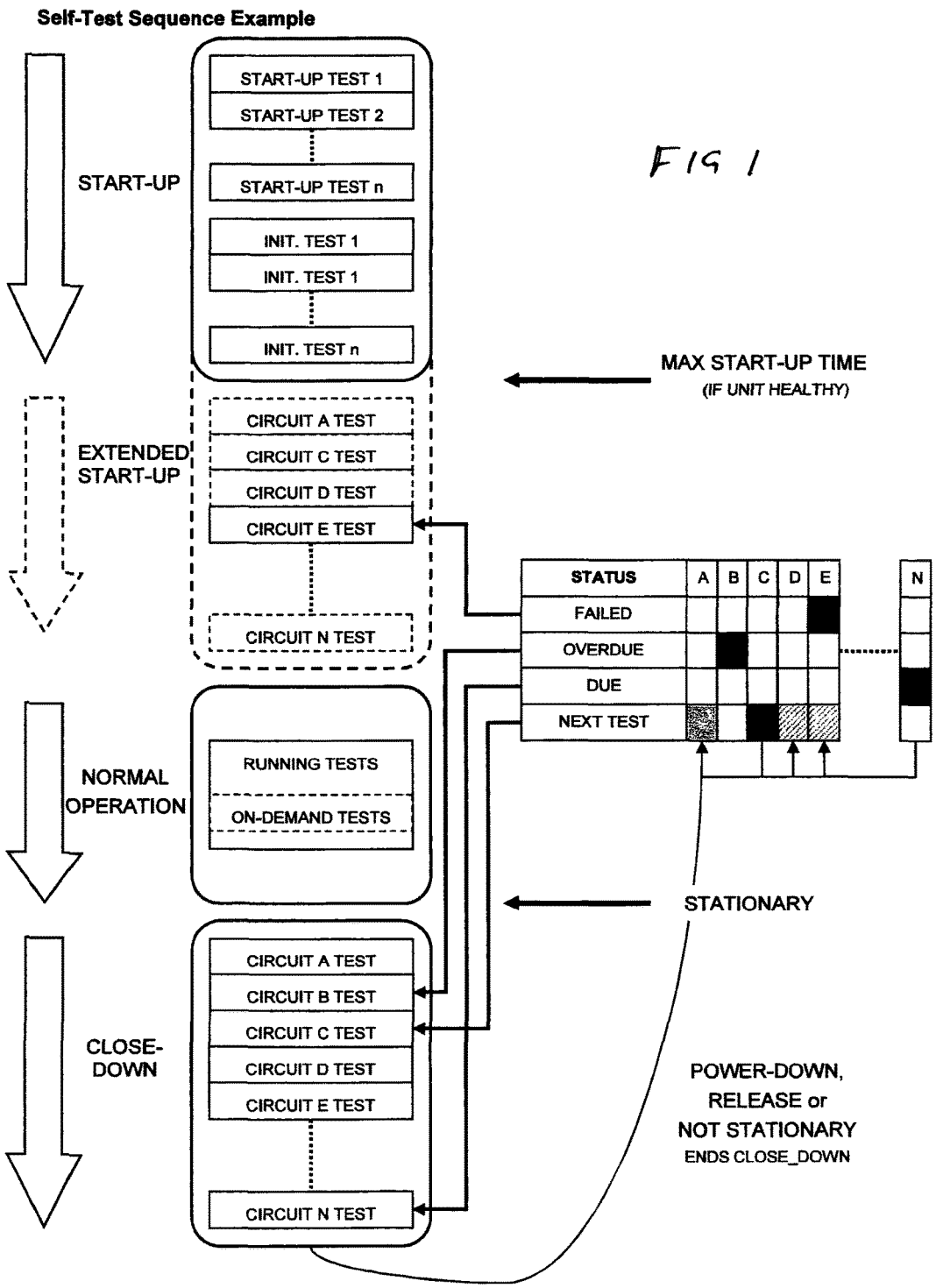
FIG. 1 shows an exemplary self-test process for a railway brake system

FIG. 1 shows an exemplary self-test sequence comprising four sections; start-up extended start-up, normal operation and close-down. In the start-up section, start-up and initialisation tests are run, typically these are generic self-tests of ECU components not specific to its application as a brake controller, or self-tests that can run without altering the state of the brake system or without providing a significant increase in the start-up time. In the extended start-up section, the only self-tests run are those required to test safety circuits which are indicated as unhealthy in the non-volatile memory and thus inhibiting prime functions. In normal operation, running tests and on-demand tests are run and in the close-down various circuit self-tests are run. Further details of these are now described in greater detail. In this exemplary embodiment, each test is assigned one of four statuses: next test, due, overdue and failed.

At start-up a set of standard ECU checks is carried out as part of the brake controller initialisation process. These tests should not perform any test procedures that would cause a healthy brake system to be in a state in which it is temporarily unable to perform prime functions at the end of the start-up period.

The status of the brake system, at the end of this start-up period, is determined from the result of the start-up and initialisation tests and the unit's status at its previous power-down, which can be recovered from the non-volatile memory. The stored status will indicate the status of the components and circuits based on any self or running (including on-demand) tests which have previously been carried out.

For each test two time intervals are defined, the first being the nominal time between tests and the second, being equal to or greater than the first, being the maximum permissible time between tests. The first such interval being termed here as the 'due' time, the second the 'overdue' time. The maximum permissible time between tests of a safety circuit must be no more than the maximum proof test period for that circuit. Proof tests are periodic tests performed on a safety circuit, where the testing interval is calculated to provide an appropriately low probability of failure on demand of the circuit.

As the brake system cannot provide its normal functionality with failed or unavailable (proof test overdue) safety critical circuits, self-tests (where possible and safe) specific to these circuits are performed in the extended start-up period.

At close-down (vehicle stationary with brakes applied) full self-test sequences can be run, with priority given to proof testing safety critical circuits, according to their status, as follows—failed, overdue, due. Following the high priority tests, other self-tests are carried out in a round-robin sequence, where testing resumes after the last test completed prior to the previous power-down. The close-down tests carry on until power is removed or brake release or wagon movement is detected. No self-test will be carried out more than once in the close-down period. The results of these tests are stored in the non-volatile memory.

Circuits whose proof test is overdue require only one successful proof test to be performed in order to become available again. Circuits that have failed previous tests may require more than one successful proof test (over successive extended start-ups and close-downs) before recovering their healthy and available status.

In the example shown in FIG. 1, following the start-up and initialisation tests, the recovered status of the safety critical circuits indicates—

Circuit E—Failed
Circuit B—Unavailable with an Overdue test
Circuit N—Available but Due a test
Circuits A, C & D are healthy, C is next to be tested in the round robin sequence.

The status of E and B allows the start-up period to be extended for self-tests to be carried out so that a self-test for Circuit E is carried out at this time. By way of example, it can be assumed for illustration purposes that there is no suitable or safe self-test for Circuit B in this start-up state (e.g. wagon moving with brakes released). Circuit B therefore remains untested.

The system moves to the normal operation state, although the operational functionality will be limited (degraded or unhealthy) because of the unavailability of Circuit B (and Circuit E if it is not yet proven healthy).

At close-down, the self-test prioritisation runs the tests as follows (assuming Circuit E is still failed).

| Failed circuits | Test Circuit E |
| --- | --- |
| Overdue Proof Test | Test Circuit B |
| Due Proof Test | Test Circuit N |
| Round-robin testing | Test Circuit C |
| | (next from previous close-down) |
| | Test Circuit D |

(Skip Circuit N Test—this has been already tested as a higher priority) Power-down Circuit A—marked as next for following close-down The house-keeping function updates the time since proof test for any untested circuit, which may result in their status being set and stored as Due or Overdue. The time since test record is reset once a suitable test (proof test) has been performed on a safety critical circuit.

In this example embodiment, self-test sequences are initiated each time the wagon is determined to have been stationary with brakes applied for a period of greater than 10 seconds. The actual time between proof tests is calculated using a total operation time recorded in units of 0.1 of an hour and stored in a non-volatile memory associated with each brake control unit. As freight systems are unpowered at rest, this may not include the time where the wagon is stationary once the brake control unit microcontroller shuts down.

Figure 2:
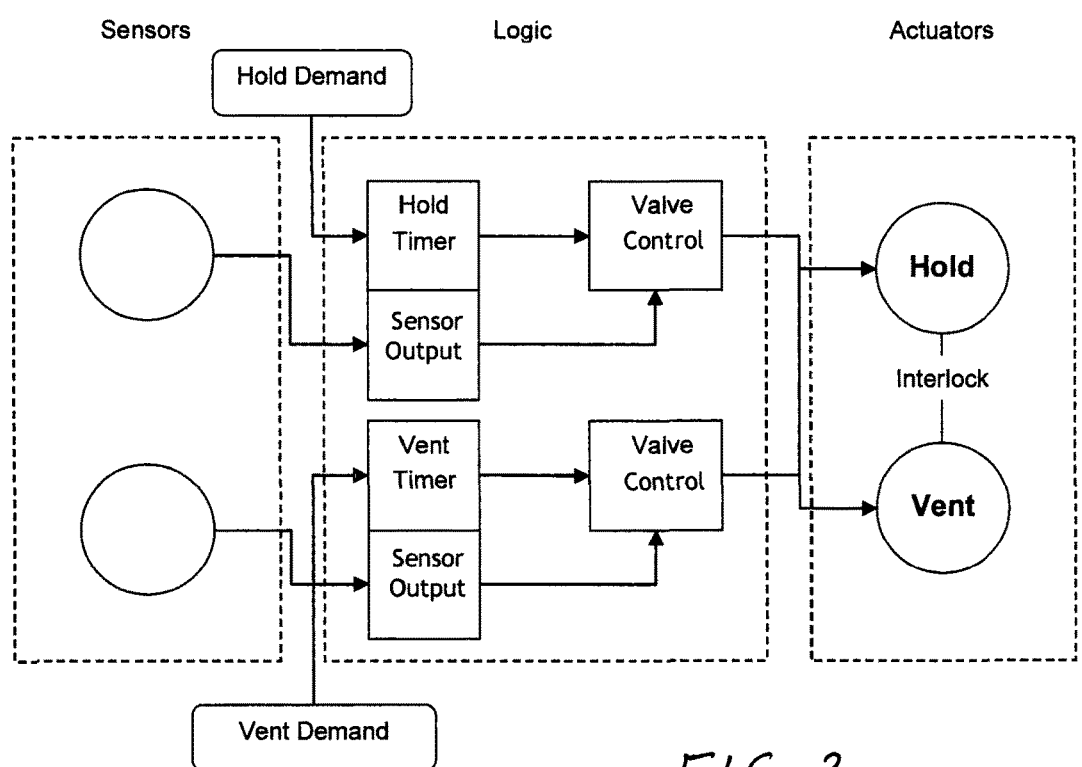
FIG. 2 shows safety-circuit is based on a One out of Two (1oo2) architecture

In the event of a proof test failure of safety critical hardware, the brake control unit reports and stores a fatal fault condition. In this exemplary embodiment the unit reports to a human interface device which displays the health status. There are alternatives known for this reporting including immediate display to the driver.

Where possible, safety-related hardware which is unavailable either due to a fault detected (by a self-test or on-demand use), or which has not been tested within the maximum period, should be tested during an extended start-up. Where appropriate, a failed safety circuit is operated in fail-safe mode until a successful test In this exemplary embodiment the safety related circuits in the brake system are used to disable operation of the respective Hold and Vent valves if they have been operated for a time exceeding that defined in the standard. These safety circuits can be based on a One out of Two (1oo2) architecture which may be represented as shown in FIG. 2.

Tests of the Hold and Vent Inhibit and Interlock circuits may be carried out during start-up. Ensuring correct function of the Hold or Vent Timer circuits can only be undertaken by self-testing and this testing of these circuits inhibits WSP operation for some time (in this embodiment a time equal to the maximum Hold or Vent period, respectively). Therefore these tests are routinely run during close-down, unless overdue or required because the circuits are unhealthy in which case they may be run during the extended start-up phase. Where the system is healthy, or otherwise able to provide WSP functionality, none of these self-tests carried out during the start-up phase will delay the brake controller's ability to provide WSP functionality should brake and wheel-slide occur.

No self-tests of the pneumatic control valves or related safety-related circuits are performed that deliberately cause the valves to operate and release brake cylinder pressure. Any requirements to verify valve operation which are required to measure or detect changes in the brake control pressure will be performed as running tests, whilst the valves are active during the normal operation of the system.

The invention claimed is:

1. A brake system having prime functions, which prime functions involve active control of equipment by a brake ECU, as contrasted to secondary functions of the brake system which do not influence operation of the equipment, which brake ECU comprises a microcontroller and a non-volatile memory, the non-volatile memory being adapted to store the result of tests on the safety circuits carried out during, before or after operation of the brake system, the result of the tests being assigned one of at least two statuses, wherein at least one of the said statuses is indicative of an unhealthy test, wherein at start-up of the brake system self-tests are carried out on the circuits or components of the brake system for which an unhealthy status has been stored in the non-volatile memory, thereby enabling the brake system to operate prime functions without prior self-test.

2. The brake system according to claim 1, wherein for each test relating to operation of a prime function, a nominal test period is defined, which nominal test period is less than or equal to a proof test period for the said safety circuit, wherein if the nominal test period for a test is exceeded the brake system operates the said safety circuit in a fail-safe mode.

3. The brake system according to claim 2, wherein tests are assigned a priority status and tests are conducted at close down in order of the priority.

4. The brake system according to claim 3, wherein failed tests are assigned the highest priority.

5. The brake system according to claim 4, wherein if the nominal test period has been exceeded, the brake system assigns a status of overdue to the circuit.

6. The brake system according to claim 5, wherein overdue status circuits are assigned the next highest priority.

* * * * *